(12) United States Patent
Yokoyama (10) Patent No.: US 9,384,355 B2
(45) Date of Patent: Jul. 5, 2016

(54) INFORMATION PROCESSING APPARATUS WITH HIBERNATION FUNCTION, CONTROL METHOD THEREFOR, AND STORAGE MEDIUM STORING CONTROL PROGRAM THEREFOR

(71) Applicant: CANON KABUSHIKI KAISHA, Tokyo (JP)

(72) Inventor: Hidehiko Yokoyama, Machida (JP)

(73) Assignee: CANON KABUSHIKI KAISHA, Tokyo (JP)

(*) Notice: Subject to any disclaimer, the term of this patent is extended or adjusted under 35 U.S.C. 154(b) by 26 days.

(21) Appl. No.: 14/078,601

(22) Filed: Nov. 13, 2013

(65) Prior Publication Data
US 2014/0137263 A1  May 15, 2014

(30) Foreign Application Priority Data
Nov. 13, 2012  (JP) .................................. 2012-249427

(51) Int. Cl.
*G06F 21/60* (2013.01)
(52) U.S. Cl.
CPC ...................................... *G06F 21/60* (2013.01)
(58) Field of Classification Search
CPC ........ G06F 21/60; G06F 21/81; G06F 9/4418
See application file for complete search history.

(56) References Cited

U.S. PATENT DOCUMENTS

| | | | | |
|---|---|---|---|---|
| 2003/0182435 A1* | 9/2003 | Redlich et al. | ................. | 709/229 |
| 2004/0003273 A1* | 1/2004 | Grawrock et al. | ............ | 713/193 |
| 2004/0103288 A1* | 5/2004 | Ziv et al. | ....................... | 713/185 |
| 2008/0201592 A1* | 8/2008 | Lawrence et al. | ............. | 713/323 |
| 2009/0013196 A1* | 1/2009 | Ito | .......................... | H04L 9/3236 713/193 |
| 2010/0024040 A1* | 1/2010 | Nimura | .................... | G06F 21/88 726/26 |
| 2011/0179264 A1* | 7/2011 | Desselle et al. | .................... | 713/2 |
| 2012/0004011 A1* | 1/2012 | Chun | .................. | G06F 11/1456 455/550.1 |
| 2012/0303971 A1* | 11/2012 | Palka et al. | .................... | 713/189 |
| 2013/0051127 A1* | 2/2013 | Parris | ............................ | 365/149 |
| 2013/0173942 A1* | 7/2013 | Forristal et al. | ............... | 713/323 |

FOREIGN PATENT DOCUMENTS

JP            2009-139990 A      6/2009

OTHER PUBLICATIONS

Wenjing et al., Novel security strategies for SRAM in powered-off state to resist physical attack, Dec. 2009, Proceedings of the 12th International Symposium on Integrated Circuits, pp. 298-301.*

* cited by examiner

*Primary Examiner* — Kenneth Chang
(74) *Attorney, Agent, or Firm* — Rossi, Kimms & McDowell LLP (57) ABSTRACT

An information processing apparatus that is capable of preventing leakage of confidential information from data saved on a nonvolatile memory even when the apparatus makes a transition to a hibernation state. The information processing apparatus with a hibernation function has a volatile memory and a nonvolatile memory. A security-area determination unit determines whether a memory area allocated to the volatile memory is a security area. A transition unit to save data saved on a memory area of the volatile memory that is determined as a non-security area by the security-area determination unit and not to save data saved on a memory area of the volatile memory that is determined as a security area, when going to a hibernation state. A resuming unit writes the data that is saved on the nonvolatile memory back to the volatile memory at the time of resuming from the hibernation state.

10 Claims, 10 Drawing Sheets

INFORMATION PROCESSING APPARATUS WITH HIBERNATION FUNCTION, CONTROL METHOD THEREFOR, AND STORAGE MEDIUM STORING CONTROL PROGRAM THEREFOR

BACKGROUND OF THE INVENTION

1. Field of the Invention

The present invention relates to an information processing apparatus, a control method therefor, and a storage medium storing a control program therefor. And particularly, the present invention relates to security management when the apparatus is in hibernation.

2. Description of the Related Art

In information processing apparatuses, such as a personal computer (PC), since processes for enabling functions are added as the number of the functions increases, start-up time from power-on until the apparatus becomes available tends to get longer. A hibernation technology is cited as one of techniques to shorten the start-up time. When the hibernation technology is used, an information processing apparatus saves data that is stored in a volatile memory, such as a CPU register or a DRAM, on a nonvolatile memory, such as a hard disk, just before power-off, for example. Then, the apparatus writes the data saved on the nonvolatile memory back to the volatile memory at start-up. Thereby, since the operating state just before the power-off reappears, start-up time can be shortened as compared with cold boot that needs to initialize hardware and software.

However, when the whole data on the volatile memory is saved on the nonvolatile memory, confidential information may leak by extracting data from the nonvolatile memory and analyzing the data because confidential information may be included in the data concerned. In order to cope with such a problem, the technique that distributes the data saved on a nonvolatile memory using a secret sharing scheme is proposed (for example, see Japanese Laid-Open Patent Publication (Kokai) No. 2009-139990 (JP 2009-139990A)).

However, since it is rare that the whole data on the nonvolatile memory is confidential information, modifying data arrangement is accompanied by certain overhead.

SUMMARY OF THE INVENTION

The present invention provides an information processing apparatus, a control method therefor, and a storage medium storing a control program therefor, which are capable of preventing leakage of confidential information from data saved on a nonvolatile memory even when the apparatus makes a transition to a hibernation state.

Accordingly, a first aspect of the present invention provides an information processing apparatus with a hibernation function that has a volatile memory and a nonvolatile memory, comprising a security-area determination unit configured to determine whether a memory area allocated to the volatile memory is a security area, a transition unit configured to save data saved on a memory area of the volatile memory that is determined as a non-security area by the security-area determination unit and not to save data saved on a memory area of the volatile memory that is determined as a security area by the security-area determination unit, when going to a hibernation state, and a resuming unit configured to write the data that is saved on the nonvolatile memory back to the volatile memory when resuming from the hibernation state.

Accordingly, a second aspect of the present invention provides a control method for an information processing apparatus with a hibernation function that has a volatile memory and a nonvolatile memory, the control method comprising a security-area determination step of determining whether a memory area allocated to the volatile memory is a security area, a transition step of saving data saved on a memory area that is determined as a non-security area in the security-area determination step and not to save data saved on a memory area of the volatile memory that is determined as a security area in the security-area determination step, when going to a hibernation state, and a resuming step of writing the data that is saved on the nonvolatile memory back to the volatile memory when resuming from the hibernation state.

Accordingly, a third aspect of the present invention provides a non-transitory computer-readable storage medium storing a control program causing a computer to execute the control method of the second aspect.

According to the present invention, only the data that does not include confidential information among the whole data saved on the volatile memory is saved on the nonvolatile memory before transition to the hibernation state. This prevents leakage of confidential information from data saved on a nonvolatile memory even when the apparatus makes a transition to the hibernation state.

Further features of the present invention will become apparent from the following description of exemplary embodiments with reference to the attached drawings.

DESCRIPTION OF THE EMBODIMENTS

Hereafter, embodiments according to the present invention will be described in detail with reference to the drawings.

Figure 1:
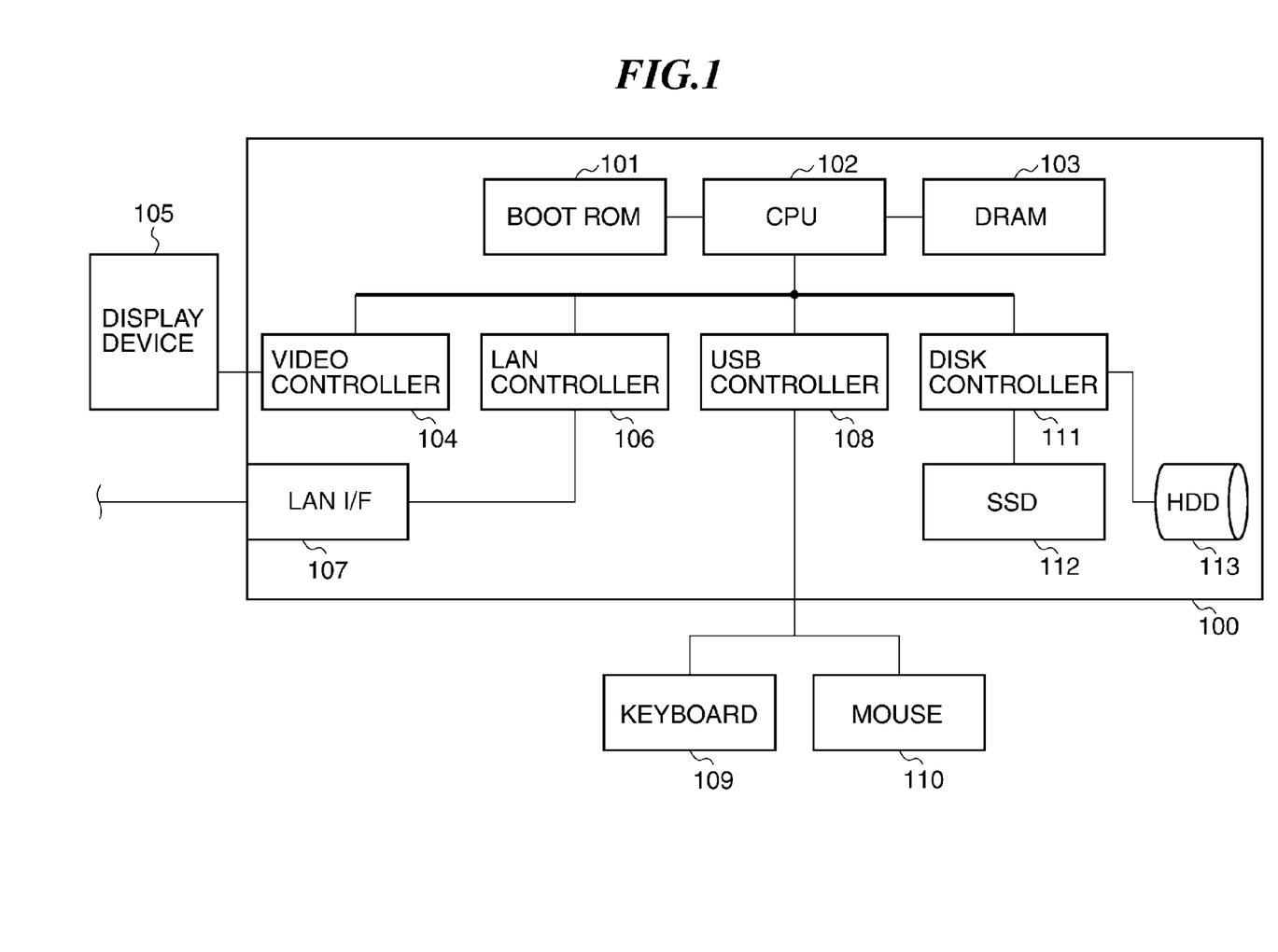
FIG. 1 is a block diagram schematically showing a hardware configuration example of an information processing apparatus according to a first embodiment of the present invention.

FIG. 1 is a block diagram schematically showing a hardware configuration example of an information processing apparatus according to a first embodiment of the present invention.

The information processing apparatus 100 is provided with a boot ROM 101, a CPU 102, a DRAM 103, a video controller 104, a LAN controller 106, a LAN_I/F 107, a USB controller 108, a disk controller 111, an SSD (Solid State Drive) 112, and an HDD 113. Moreover, the main unit of the information processing apparatus 100 is connected with an operation unit that consists of a keyboard 109 and a mouse 110, and a display device 105 that is a display unit.

When electric power is supplied to the information processing apparatus 100 by turning power ON, the CPU 102 executes an initialization program saved on the boot ROM 101. After executing an initialization process by the initialization program, the CPU 102 copies programs saved on the SSD 112 or the HDD 113 to the DRAM 103 as a volatile memory, and executes them successively. The SSD 112 and the HDD 113, which are nonvolatile memories, store an operating system (OS) for controlling the information processing apparatus 100, and store various application programs, program files, and data files.

The video controller 104 controls screen information outputted to the display unit 105. The LAN (Local Area Network) controller 106 sends and receives information with a network connected through the LAN_I/F 107.

The USB controller 108 controls the operation unit, such as the connected keyboard 109 and the mouse 110. The disk controller 111 controls the SSD 112 and the HDD 113.

The information processing apparatus 100 is provided with a hibernation function. The hibernation function saves data stored on the DRAM 103 as a volatile memory to the SSD 111 or the HDD 113 as nonvolatile memories when the apparatus goes into a hibernation state, and writes the data saved on the SSD 111 or the HDD 113 back to the DRAM 103 to restore the apparatus to the state that precedes the hibernation when the apparatus resumes out of the hibernation state.

In this embodiment, the data that is saved on the HDD 113 etc. from the DRAM 103 when the apparatus goes into the hibernation state, and that is written back to the DRAM 103 from the HDD 113 etc. when the apparatus resumes out of the hibernation state is called hibernation data. The hibernation data is generated by excluding security data from the data saved on the DRAM 103 at the time of transition to the hibernation state.

Next, an example of a memory area allocated to the DRAM 103 by an application program (referred to as "application", hereafter) that runs on the information processing apparatus 100 will be described.

Figure 2:
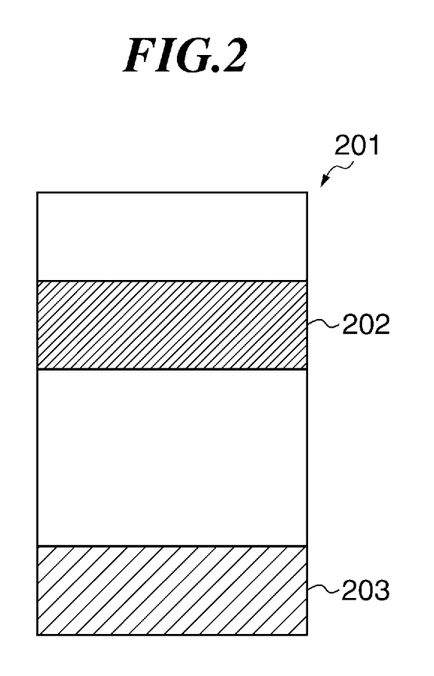
FIG. 2 is a view showing an example of a memory area on a DRAM allocated to application programs in the information processing apparatus shown in FIG. 1.

FIG. 2 is a view showing an example of a memory area on the DRAM 103 allocated to an application.

When receiving an allocation request for a memory area from an application, the OS detects an available unused memory area 201 among the whole memory area of the DRAM 103, reserves the memory area of requested capacity, and returns its head address to the application. For example, the illustrated memory areas 202 and 203 are allocated as the memory area of the application. Generally, memory areas in the DRAM 103 are divided discontinuously and are allocated in response to the allocation requests from an application. Accordingly, it is necessary to determine whether security data is included in the data saved in each memory area at the time of transition to the hibernation state.

Figure 3:
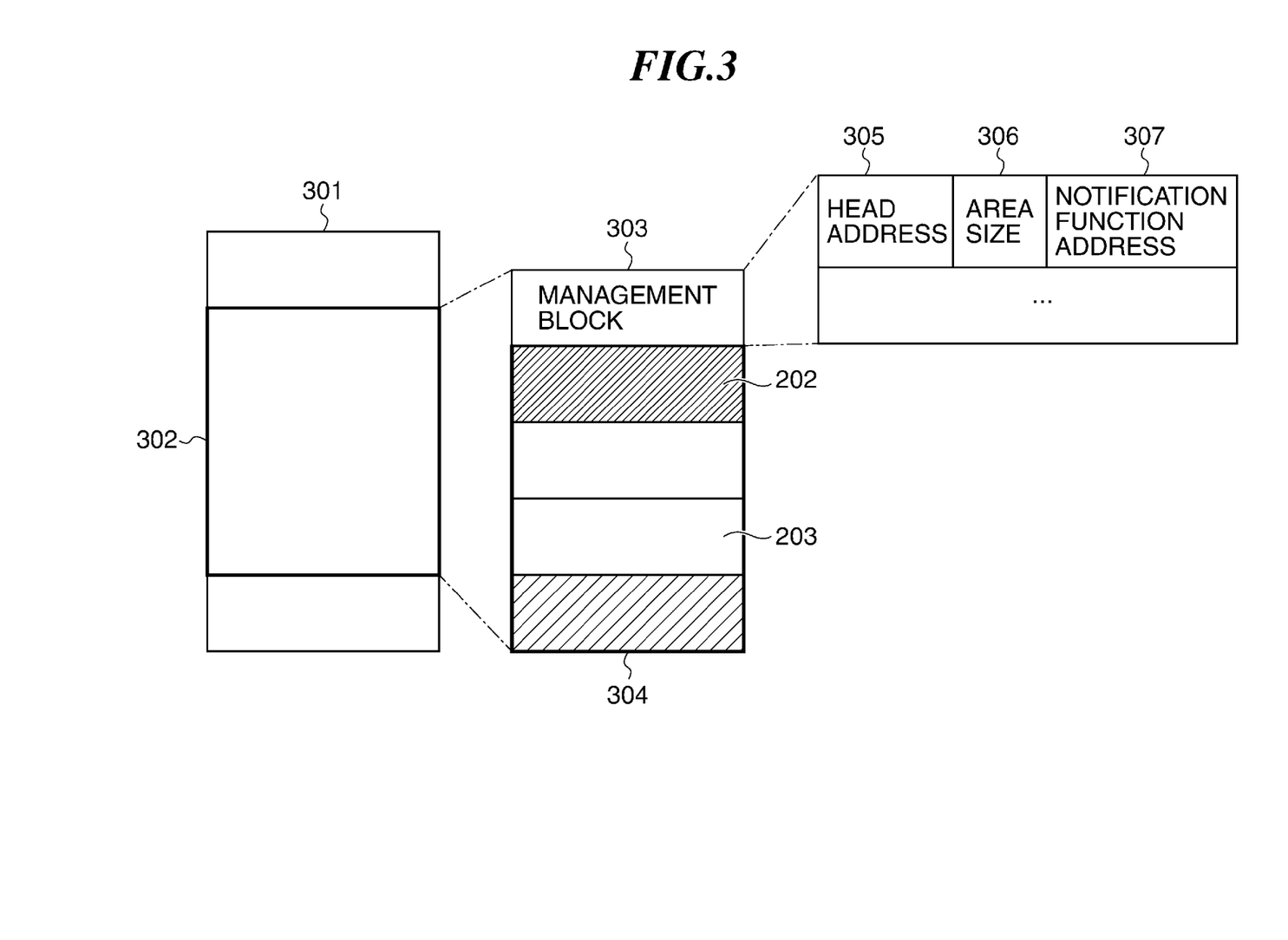
FIG. 3 is a view showing an example of a memory area allocated to a DRAM by a memory manager in the information processing apparatus shown in FIG. 1.

FIG. 3 is a view showing an example of a memory area allocated to the DRAM 103 by a memory manager.

In the information processing apparatus 100, when the memory manager (a memory area management unit that is a function executed by the CPU 102) that manages the memory area requests to the OS, a memory area 302 of which size is set as a system design is allocated in the memory area 301 of the DRAM 103 as illustrated at start-up of the apparatus. The memory area 302 consists of a management block 303 and the allocated area 304 to the application.

The management block 303 is a group of management entries that is constituted from a head address 305 of a memory area, an area size 306 of the memory area, and a notification function address 307. The notification function is called at the time of resumption from the hibernation state, and serves as a trigger of data initialization.

The head address and the area size of the allocated area 304 to the application are set to the first management entry. The head addresses, the area sizes, and the addresses of the notification functions, which are associated with the memory areas allocated in response to the allocation requests for a memory area from the application, are set to the second and later management entries.

Figure 4:
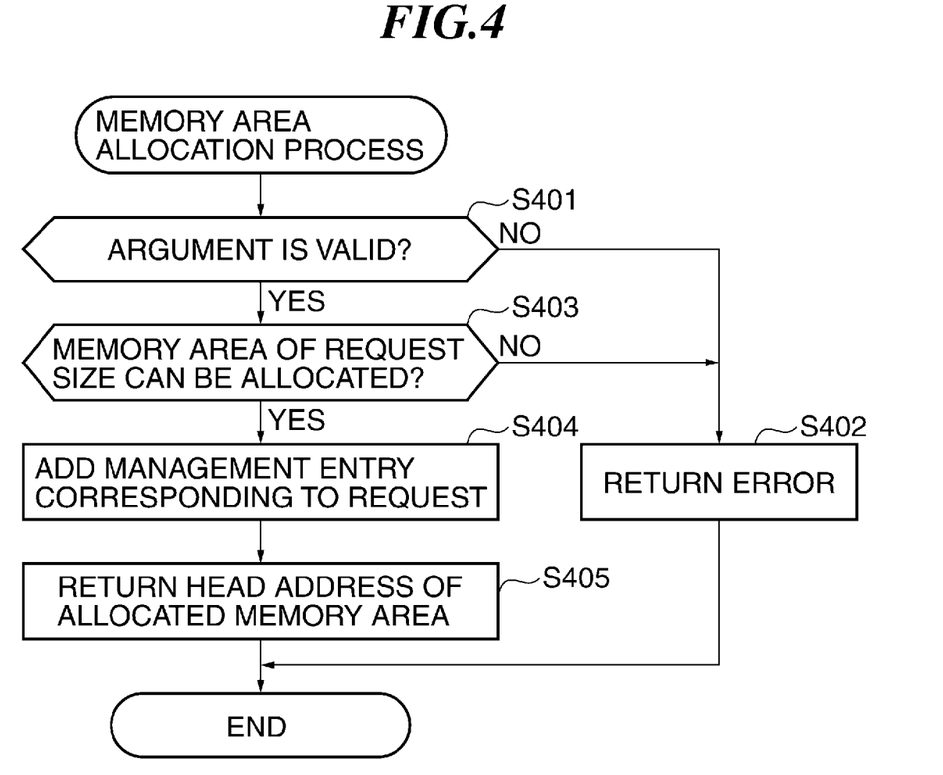
FIG. 4 is a flowchart showing a memory area allocation process for the DRAM by the memory manager in the information processing apparatus shown in FIG. 1.

FIG. 4 is a flowchart showing a memory area allocation process for the DRAM 103 by the memory manager.

When receiving an allocation request for a memory area from the application, the memory manager determines whether an argument included in the request is valid (step S401). When determining that the argument is not valid, the memory manager returns an error (step S402) and finishes this process.

On the other hand, when determining that the argument is valid in the step S401, the memory manager determines whether the memory area of the request size can be allocated to the memory area 302 that was reserved beforehand (step S403). This is determined by searching the management block 303 in FIG. 3, and by comparing a free-area size of the allocated area 304 with the request size.

When it is determined that the memory area of the request size cannot be allocated in the step S403, the memory manager returns an error (step S402), and finishes this process. On the other hand, when it is determined that the memory area of the request size can be allocated (YES in the step S403), the process proceeds to step S404.

In the step S404, the memory manager adds the management entry in which the head address and the area size of the allocated memory area and the address of the notification function are set to the management block 303.

Next, the memory manager returns the head address of the allocated memory area to the application (step S405), and finishes this process.

Figure 5:
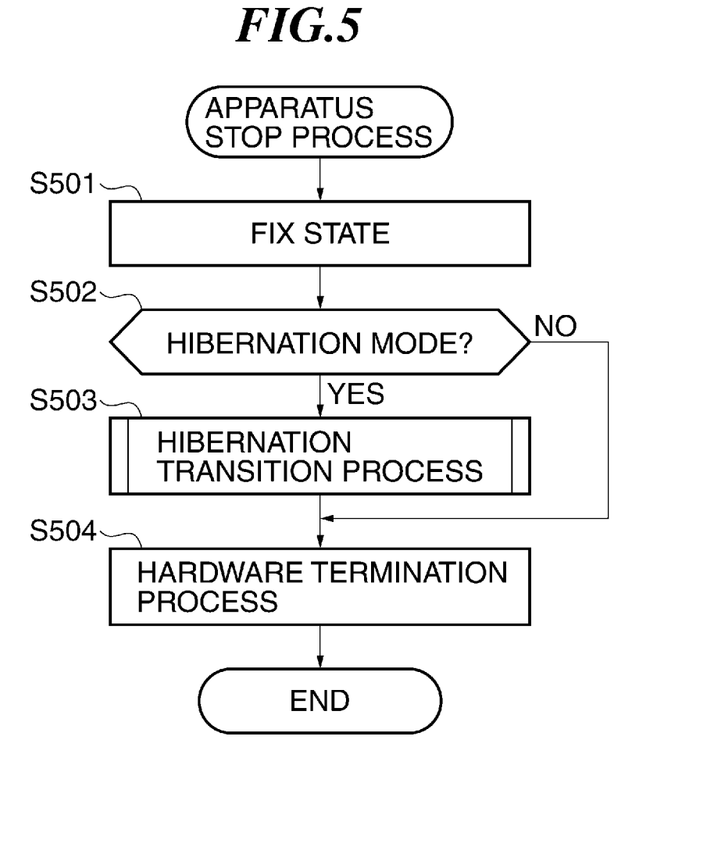
FIG. 5 is a flowchart showing an apparatus stop process in the information processing apparatus shown in FIG. 1.
Figure 6:
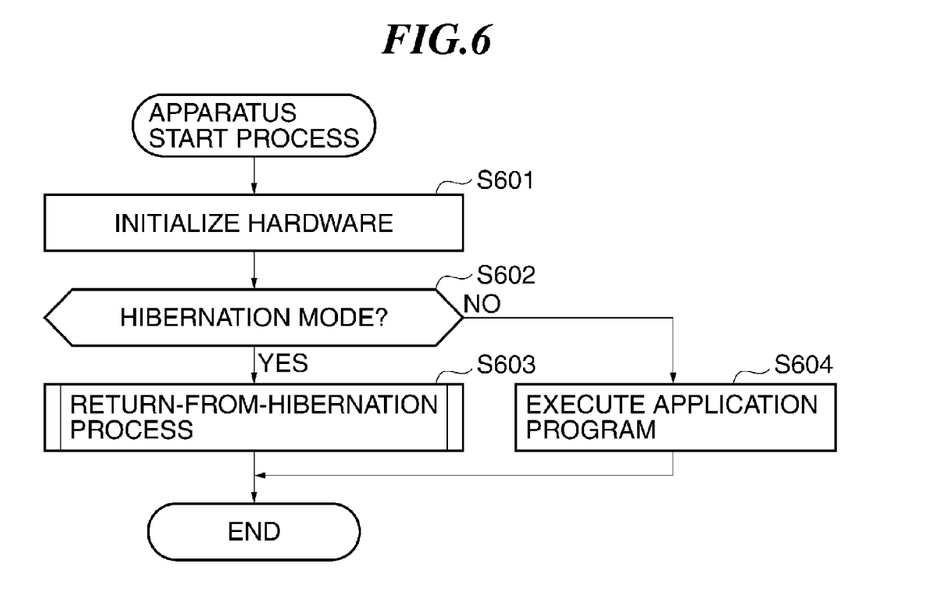
FIG. 6 is a flowchart showing an apparatus start process in the information processing apparatus shown in FIG. 1.

FIG. 5 is a flowchart showing an example of an apparatus stop process in the information processing apparatus 100. FIG. 6 is a flowchart showing an example of an apparatus start process in the information processing apparatus 100. It should be noted that the CPU 102 shall execute the illustrated processes.

As shown in FIG. 5, when a stop instruction occurs from an operator or a manager of the information processing apparatus 100, the CPU 102 fixes the state by writing the data cached by a register in the CPU 102 (not shown) and the DRAM 103 into the HDD 113 etc. (step S501).

Next, the CPU 102 determines whether the stop mode is a hibernation mode or a normal mode in step S502. The stop mode is set up by an operator etc. of the information processing apparatus 100 beforehand through the display device 105, and the setup information is saved on the HDD 113 etc. The CPU 102 determines whether the stop mode is the hibernation mode or the normal mode by referring to the setup information saved. It should be noted that there shall be two kinds of stop modes including the hibernation mode and the normal mode, but there may be other modes.

When it is determined that the stop mode is the hibernation mode in the step S502, a hibernation transition process is executed (step S503), and the process proceeds to step S504. The details of the hibernation transition process in the step S503 will be mentioned later.

When it is determined that the stop mode is the normal mode in the step S502, the process proceeds to the step S504, and the CPU 102 performs termination processes for various hardware units mounted on the information processing apparatus 100, and brings the apparatus into an idle state.

As shown in FIG. 6, when receiving an start request from the operator etc., the CPU 102 initializes the various hardware units mounted on the information processing apparatus 100 with the OS read from the boot ROM 101, and transitions the hardware units to an available state (step S601).

Next, the CPU 102 determines whether the stop mode is the hibernation mode or the normal mode in step S602 in the same manner as the step S502 in FIG. 5. When it is determined that the stop mode is the hibernation mode, a return-from-hibernation process is executed (step S603), and the process is finished. The details of the return-from-hibernation process in the step S603 will be mentioned later.

On the other hand, when it is determined that the stop mode is the normal mode in the step S602, the CPU 102 reads an application into the DRAM 103 from the HDD 113 etc., executes it (step S604), and finishes this process.

Next, the hibernation transition process in the step S503 in FIG. 5 and the return-from-hibernation process in the step S603 in FIG. 6 will be described using FIG. 7 and FIG. 8.

Figure 7:
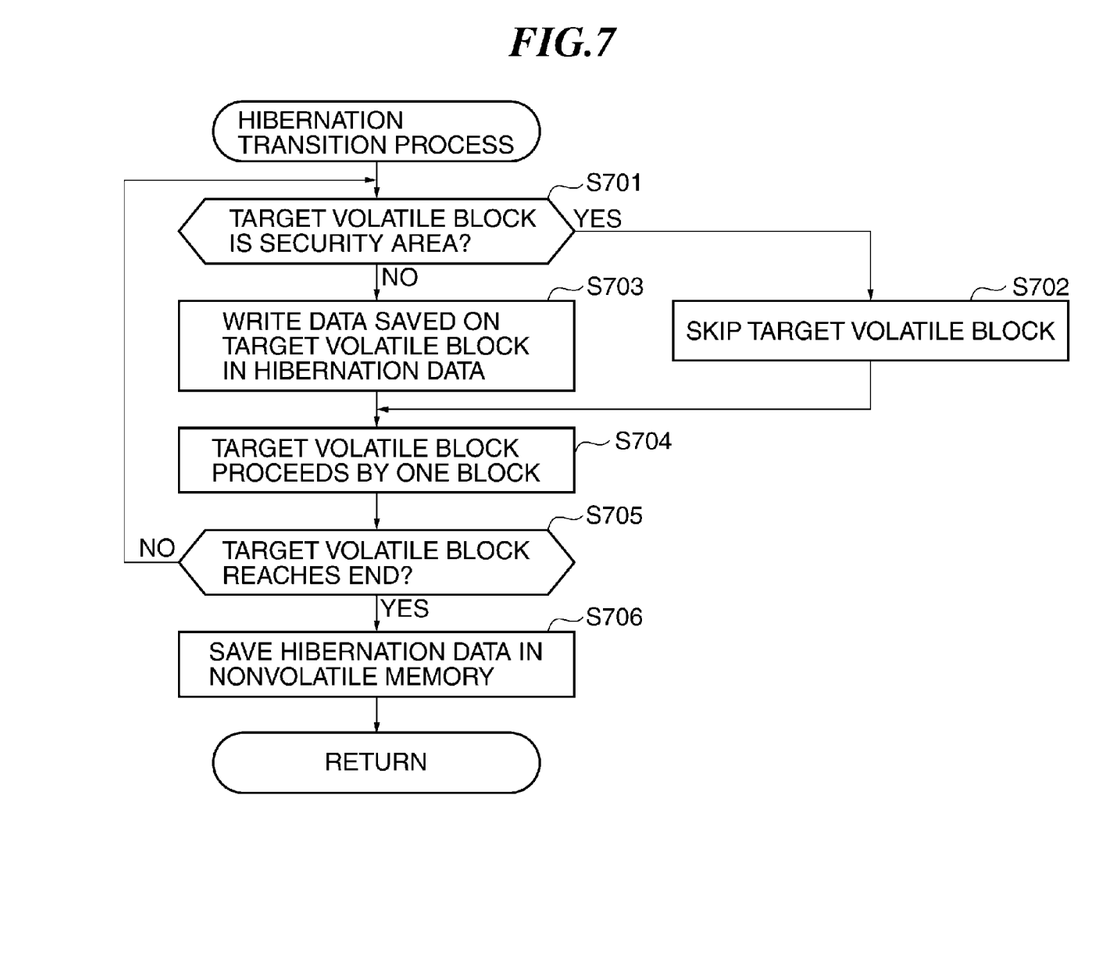
FIG. 7 is a flowchart showing an example of a hibernation transition process according to the first embodiment of the present invention.

FIG. 7 is a flowchart showing an example of the hibernation transition process in the step S503 in FIG. 5.

In step S701, the CPU 102 determines whether each volatile block is a security area from the top volatile block among the memory area allocated to the DRAM 103. A volatile block is a unit (size) of data read from the DRAM 103 at once when hibernation data is generated. The CPU 102 determines whether a volatile block is a security area according to whether the target volatile block is included in the allocated area 304 allocated by the memory manager. When the application requests allocation of a memory area, the memory manager determines that the memory area is a security area because a memory area in the allocated area 304 is allocated in response to the allocation request. Then, the data saved on this memory area is not written in the hibernation data.

Since a memory area is allocated to areas other than the allocated area 304 in the DRAM 103 when a memory area is allocated by means other than the memory manager on the other hand, it is determined that the area is not a security area. Then, the data saved on this area is written in the hibernation data. In the step S701, the CPU 102 functions as a security-area determination unit.

When it is determined that the volatile block is a security area in the step S701, the CPU 102 skips the volatile block concerned by one block (step S702), and proceeds with the process to step S704.

On the other hand, when it is determined that the volatile block is not a security area in the step S702, the process proceeds to step S703. In the step S703, the CPU 102 writes the data saved on the volatile block concerned in the hibernation data. Then, a target volatile block proceeds by one block (step S704). It should be noted that the allocated area 304 is determined as a security area among the DRAM 103, but the management block 303 is not determined as a security area. That is, the data of the management block 303 will be included in the hibernation data.

Next, the CPU 102 determines whether the target memory block has reached the end of the volatile area in step S705. The end of the volatile area refers to the end of the DRAM 103. When it is determined that the target memory block has not reached the end in the step S705, the process returns to the step S701. Thus, the process for determining whether the block is in a security area and for writing data saved on the volatile block that is not in a security area in the hibernation data is repeated from the top to the end of the DRAM 103 for every volatile block. Then, when it is determined that the block has reached the end, the CPU 102 saves the generated hibernation data on the HDD 113 etc. (step S706), and returns the process to FIG. 5.

Figure 8:
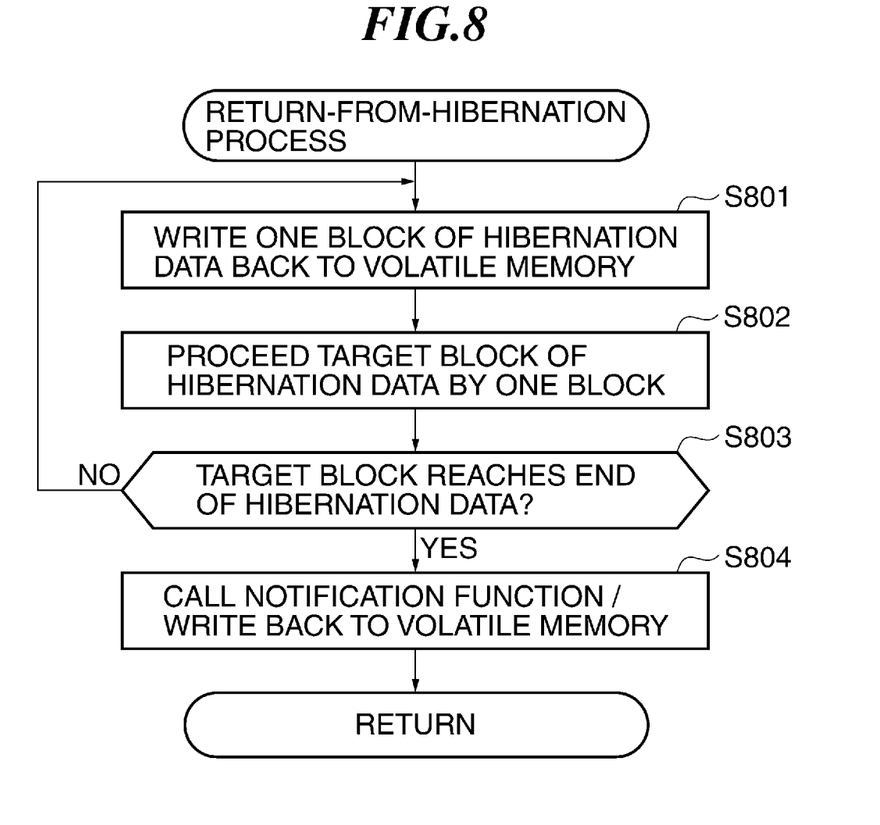
FIG. 8 is a flowchart showing an example of a return-from-hibernation process according to the first embodiment of the present invention.

FIG. 8 is a flowchart showing an example of the return-from-hibernation process in the step S603 in FIG. 6.

In step S801, the CPU 102 writes one block of the hibernation data saved on the HDD 113 etc. back to the DRAM 103. The block here means the volatile block mentioned above.

Next, the CPU 102 proceeds the target block in the hibernation data by one block in the step S802, and determines whether the target block reaches the end of the hibernation data in the step S803. When it is determined that the target memory block has not reached the end of the hibernation data in the step S803, the process returns to the step S801.

On the other hand, when it is determined that the target memory block has reached the end of the hibernation data in the step S803, the process proceeds to step S804.

In the step S804, the memory manager controls so as to regenerate the security data by calling the notification functions based on the notification function addresses 307 with reference to the second and later management entries of the management block 303, and the process returns. Thus, application can regenerate the security data when the notification function is called.

Figure 11:
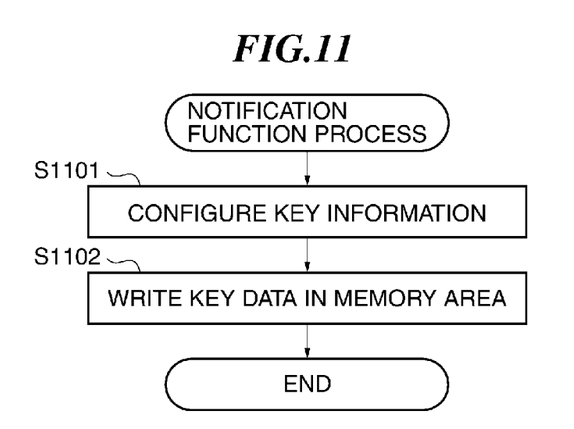
FIG. 11 is a flowchart showing a notification function process in the information processing apparatus shown in FIG. 1.

Since the allocated memory area is cleared by the hibernation transition process, the notification function is called after the return-from-hibernation process is completed. For example, a process of a notification function in the case of using a memory area in order to hold an encryption key of an enciphered program is shown in FIG. 11.

In the process of a notification function, key information is configured (step S1101), and the key data is written in the memory area concerned (step S1102).

Since a purpose differs for every memory area, a process of a notification function also differs for every purpose. For example, since a value is set up in a memory area every time of usage when a memory area is used for holding information temporarily, the process of a notification function may perform nothing.

According to this embodiment, the memory manager allocates a memory area from among the memory area reserved beforehand in response to an allocation request of a memory area from an application. Then, the data in the memory area reserved beforehand is not included in hibernation data at the time of generating hibernation data. And the hibernation data is written back to the volatile memory at the time of resumption from the hibernation state. Then, the application regenerates the security data when the memory manager calls the notification function that was transferred together with the allocation request of the memory area. Thus, since no security data is included in the hibernation data, leakage of confidential information is prevented even if a nonvolatile memory, such as the HDD 113, is detached and the hibernation data is extracted.

Next, a second embodiment of the present invention will be described. Since the configuration shown in FIG. 1 of the above-mentioned first embodiment is common to the second embodiment of the present invention, the same sections are represented by the same reference numerals and the descriptions therefor are omitted. Hereafter, only points different from the above-mentioned first embodiment will be described.

An information processing apparatus according to the second embodiment of the present invention is connectable to a security device that encrypts and decrypts data. The security device generates hibernation data by encrypting the data saved on the volatile memory at the time of transition to the hibernation state. Then, when the apparatus resumes from the hibernation state, the security device decrypts the encrypted hibernation data that is saved on the nonvolatile memory and the decrypted data is written back to the volatile memory.

Figure 9:
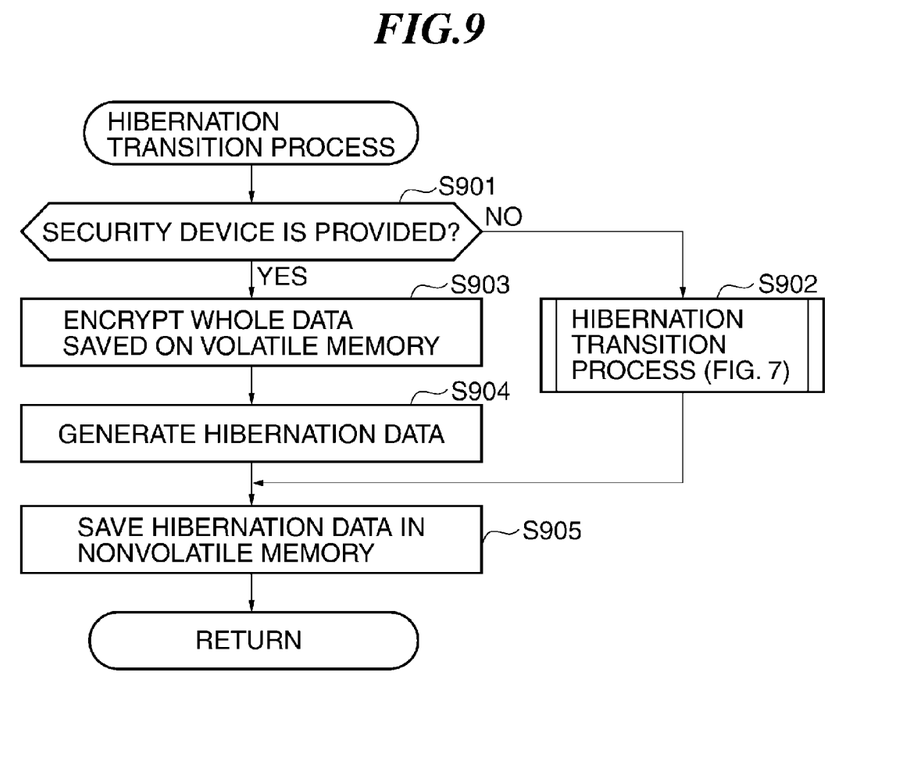
FIG. 9 is a flowchart showing an example of a hibernation transition process according to a second embodiment of the present invention.

FIG. 9 is a flowchart showing an example of a hibernation transition process according to a second embodiment of the present invention.

In step S901, the CPU 102 determines whether the security device (not shown) is connected to the main unit of the information processing apparatus 100. In the step S901, the CPU 102 functions as a security-device detection unit.

When it is determined that the security device is not connected in the step S901, the hibernation transition process in the first embodiment shown in FIG. 7 is executed (step S902). On the other hand, when it is determined that the security device is connected in the step S901, the security device encrypts the whole data saved on the DRAM 103 (step S903), and a hibernation data is generated (step S904). The CPU 102 stores the hibernation data generated in the step S904 in the HDD 113 etc. (step S905), and finishes this process.

Figure 10:
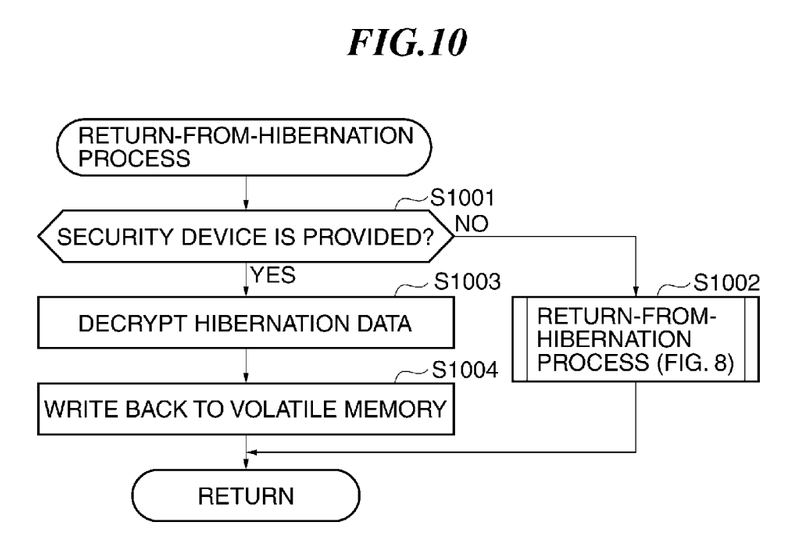
FIG. 10 is a flowchart showing an example of a return-from-hibernation process according to the second embodiment of the present invention.

FIG. 10 is a flowchart showing an example of a return-from-hibernation process according to the second embodiment of the present invention.

In step S1001, the CPU 102 determines whether the security device is connected to the main unit of the information processing apparatus 100. In the step S1001, the CPU 102 functions as a security-device detection unit.

When it is determined that the security device is not connected in the step S1001, the return-from-hibernation process in the first embodiment shown in FIG. 8 is executed (step S1002). On the other hand, when it is determined that the security device is connected in the step S1001, the hibernation data saved on the HDD 113 etc. is read and is decrypted by the security device (step S1003). Then, the decrypted data is written back to the DRAM 103 (step S1004). Then, the information processing apparatus 100 returns to an active state.

Although this embodiment describes the configuration in which the security device is connected to the information processing apparatus, a security function for encrypting and decrypting data may be added to the information processing apparatus. In this case, it is determined whether the security function is provided or not in the steps S901 and S1001. Moreover, the security device may employ any kinds of methods of encryption and decryption.

According to this embodiment, when the security device is connected to the information processing apparatus 100, the security device encrypts the data saved on the volatile memory to generate hibernation data at the time of transition to the hibernation state. Then, the security device decrypts the hibernation data and writes the decrypted data back to the volatile memory at the time of resumption from the hibernation state. Thus, when the information processing apparatus has the security function, since confidential information is encrypted and written in the hibernation data even if the volatile memory stores the confidential information, leakage of the confidential information from the hibernation data can be prevented.

Next, a third embodiment of the present invention will be described. Since the configuration shown in FIG. 1 of the above-mentioned first embodiment is common to the third embodiment of the present invention, the same sections are represented by the same reference numerals and the descriptions therefor are omitted. Hereafter, only points different from the above-mentioned first embodiment will be described.

In the third embodiment, the data saved on the security area is perfectly erased. The perfect erasing process is to overwrite the data and the file that are subjected to be perfectly erased with a specific pattern, such as a list of zeros or a random number, when the used data is deleted or the system shuts down.

An information processing apparatus 100 in this embodiment performs the normal hibernation transition process after executing the perfect erasing process that perfectly erases an allocated area 304 to an application, when the perfect erasing process is available. Then, the information processing apparatus 100 goes into a hibernation state after the whole data saved on a volatile memory is saved in hibernation data. At the time of resuming from the hibernation state, the return-from-hibernation process shown in FIG. 8 is performed.

According to this embodiment, the normal hibernation transition process is performed after executing the perfect erasing process that perfectly erases the allocated area 304 to the application, when the perfect erasing process is available. Then, the whole data saved on the volatile memory is saved in the hibernation data. Furthermore, the hibernation data is written back to the volatile memory and the application is notified with the first embodiment at the time of resuming from the hibernation state. Since the data invalidated by the perfect erasing process is included in the hibernation data, leakage of confidential information is prevented.

Although the present invention is applied to the information processing apparatuses in the descriptions of the first through third embodiments, a usage of the invention is not limited to that. The present invention can be applied to an image forming apparatus, an image processing apparatus, and other electronic devices, and the above-mentioned effect of the present invention is obtained even in such a case.

Other Embodiments

Aspects of the present invention can also be realized by a computer of a system or apparatus (or devices such as a CPU or MPU) that reads out and executes a program recorded on a memory device to perform the functions of the above-described embodiment(s), and by a method, the steps of which are performed by a computer of a system or apparatus by, for example, reading out and executing a program recorded on a memory device to perform the functions of the above-described embodiment(s). For this purpose, the program is provided to the computer for example via a network or from a recording medium of various types serving as the memory device (e.g., computer-readable medium).

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2012-249427, filed on Nov. 13, 2012, which is hereby incorporated by reference herein in its entirety.

What is claimed is:

1. An information processing apparatus with a hibernation function that has a volatile memory and a nonvolatile memory, comprising:
    at least one non-transitory memory device;
    at least one processor;
    a transition unit configured to save first data in the nonvolatile memory and not to save second data in the nonvolatile memory, when transitioning to a hibernation state, the volatile memory storing the first data in a non-security area of the volatile memory and storing the second data in a security area of the volatile memory, before transitioning to the hibernation state; and
    a resuming unit configured to write the first data in the nonvolatile memory back to the volatile memory when resuming from the hibernation state,
    wherein the transition unit and the resuming unit are implemented at least in part by the at least one processor executing at least one program recorded on the at least one non-transitory memory device.

2. The information processing apparatus according to claim 1, further comprising:
    a security-area determination unit configured to determine whether a memory area allocated to each of a plurality of areas of the volatile memory is the security area or the non-security area;
    a memory-area management unit configured to manage a notification function in connection with a head address of a memory area allocated to the volatile memory,
    wherein the security-area determination unit and the memory-area management unit are implemented at least in part by the at least one processor executing at least one program recorded on the at least one non-transitory memory device.

3. The information processing apparatus according to claim 2, wherein said security-area determination unit determines that a memory area managed by said memory-area management unit among the entire memory area of the volatile memory is a security area.

4. The information processing apparatus according to claim 2, wherein said resuming unit regenerates the data that was saved in the security area by calling the notification function in connection with the head address of the allocated memory area.

5. The information processing apparatus according to claim 1, further comprising:
    a security-area determination unit configured to determine whether a memory area allocated to each of a plurality of areas of the volatile memory is the security area or the non-security area; and
    a security-device detection unit configured to determine whether a security device that encrypts and decrypts data is provided,
    wherein said transition unit saves only the first data when said security-device detection unit determines that a security device is not provided, and
    wherein the security-area determination unit and the security-device detection unit are implemented at least in part by the at least one processor executing at least one program recorded on the at least one non-transitory memory device.

6. The information processing apparatus according to claim 1, wherein said transition unit erases the second data, when transitioning to the hibernation state.

7. The information processing apparatus according to claim 3, wherein said security-area determination unit determines that a memory area not managed by said memory-area management unit among the entire memory area of the volatile memory is a non-security area.

8. The information processing apparatus according to claim 1, wherein the security area is an area where data to be secured is stored.

9. A control method for an information processing apparatus with a hibernation function that has a volatile memory and a nonvolatile memory, the control method comprising:
    saving first data in the nonvolatile memory and not saving second data in the nonvolatile memory, when transitioning to a hibernation state, the volatile memory storing the first data in a non-security area of the volatile memory and storing the second data in a security area of the volatile memory, before transitioning to the hibernation state; and
    writing the first data in the nonvolatile memory back to the volatile memory when resuming from the hibernation state.

10. A non-transitory computer-readable storage medium storing a control program causing a computer to execute a control method for an information processing apparatus with a hibernation function that has a volatile memory and a nonvolatile memory, the control method comprising:
    saving first data in the nonvolatile memory and not saving second data in the nonvolatile memory, when transitioning to a hibernation state, the volatile memory storing the first data in a non-security area of the volatile memory and storing the second data in a security area of the volatile memory, before transitioning to the hibernation state; and
    writing the first data in the nonvolatile memory back to the volatile memory when resuming from the hibernation state.

* * * * *